Jan. 6, 1970 HIROSHI IHARA 3,488,643

NON-RETURN TO ZERO DRIVING METHOD FOR MAGNETIC MEMORY DEVICES

Filed Dec. 14, 1966 4 Sheets-Sheet 1

INVENTOR.
HIROSHI IHARA

BY

OSTROLENK, FABER, GERB & SOFFEN

ATTORNEYS

INVENTOR.
HIROSHI IHARA
BY
OSTROLENK, FABER, GERB & SOFFEN
ATTORNEYS

INVENTOR.
HIROSHI IHARA
BY
OSTROLENK, FABER, GERB & SOFFEN
ATTORNEYS

Jan. 6, 1970 HIROSHI IHARA 3,488,643

NON-RETURN TO ZERO DRIVING METHOD FOR MAGNETIC MEMORY DEVICES

Filed Dec. 14, 1966 4 Sheets-Sheet 4

INVENTOR.
HIROSHI IHARA

BY

OSTROLENK, FABER, GERB & SOFFEN

ATTORNEYS

United States Patent Office 3,488,643

Patented Jan. 6, 1970

3,488,643

NON-RETURN TO ZERO DRIVING METHOD FOR MAGNETIC MEMORY DEVICES

Hiroshi Ihara, Tokyo, Japan, assignor to Nippon Electric Company Limited, Tokyo, Japan Filed Dec. 14, 1966, Ser. No. 601,675

Claims priority, application Japan, Dec. 21, 1965, 40/78,772

Int. Cl. G11b *5/00*

U.S. Cl. 340—174 14 Claims

ABSTRACT OF THE DISCLOSURE

The invention relates to a novel method of driving memory storage devices of the memory core matrix type, as one example, wherein a non-return-to-zero bit drive pulse is applied to the bit drive windings of the matrix in conjunction with word drive pulses applied to the word drive windings for selectively writing either binary ZERO or binary ONE saturation states into the core members wherein the non-return-to-zero pulse reduces the duration of the noise voltage pulses normally encountered in such memories to less than one-half the pulse duration. The result of this novel method is to provide much faster switching times and thereby appreciably reduce the time period required for termination of the noise signals before the next driving pulse may be applied to the memory devices.

The instant invention relates to binary information memory devices in which a plurality of memory elements are typically arranged in a regular matrix, and more particularly to a new and improved bit drive method for driving such memory devices arranged in the well-known word or linear selection type configurations so as to result in an appreciable reduction in cycle time for the memory.

A variety of magnetic memory elements capable of extraordinarily fast switching times have been developed in recent years. Operating speeds, or cycle times, of such memory devices using high-speed memory elements, however, are still nevertheless many time slower than the inherent switching times of such memory elements. Therefore, it cannot be said that the inherent high switching speeds of the memory elements per se have fully contributed to a reduction in operating speeds of the memory devices.

There are various reasons for the slow operating speeds encountered in present day memory devices such as, for example, the slow switching time of transistors employed in the drive circuit and the long periods of time required for signal transmission in the memory planes, to name just a few. The most prominent of the above factors which cause slow switching times and that has drawn the attention of those skilled in the art of memory devices is the inevitable occurrence of noise voltages which are induced in the memory planes by bit drive pulses employed in the memory driving operation.

The recognition of the fact that the occurrence of noise voltages is the major obstacle standing in the way of reducing cycle time or operating time has resulted in the devolpment of various improvements for reducing the amount of noise encountered in such devices. However, in spite of these improvements, which have been mainly concerned with the physical structures of the memory planes, no perfect solution has been developed which results in complete elimination of the noise voltages, although present day attempts have succeeded to some extent.

The instant invention is characterized by providing a novel method for driving such memory planes so as to reduce signficantly the switching or cycle times of memory devices as compared with conventional techniques.

The instant invention, in one preferred embodiment thereof, provides a memory plane comprised of a plurality of saturable magnetic cores (for example) arranged in a regular matrix and being threaded with columnar word drive windings, a plurality of bit drive windings arranged in rows and a plurality of sense windings also arranged in rows.

The word drive pulse is applied to a selected one of the columnar windings while the bit drive pulse is applied to the bit drive windings. The word drive pulse train may assume a variety of forms which typically is either a negative going pulse followed immediately by a positive going pulse or solely by a negative going pulse.

The bit drive pulse of present day devices usually takes the form of a postive going pulse or a negative going pulse in one type of memory drive means or simply a positive going pulse and no pulse for the purpose of writing in binary ONES or binary ZEROS, respectively. Conventional structures develop an output pulse in the sense winding followed by postive and negative going noise voltages of magnitude a many times greater than the information pulse and of pulse durations which are quite substantial in length of time necessitating a long delay before application of the next matrix driving operation and thereby destroying the value of using magnetic memory elements having very high-speed switching times.

The instant invention employs a bit drive pulse of the non-return-to-zero (NRZ) type requiring switching in pulse polarity only in those cases where succeeding adjacent bits to be read into or out of memory are of opposite binary states.

In those memories employing a word drive pulse train comprised of a negative going pulse followed by a positive going pulse the switching of the bit drive pulse of the instant invention (if required as a result of readout of succeeding adjacent bit of differing binary value) is caused to change its polarity at substantially the same time at which the leading edge of the positive going bit current pulse occurs. The result of this is that the pulse train sensed by the sense winding is comprised of an information pulse followed by a noise voltage pulse of less than half the pulse duration of noise voltage pulses developed in sense windings employing conventional memory driving methods. The timing relationship of the non-return-to-zero bit drive pulse train is provided with similar timing relationships relative to the word drive pulse employed in a manner to be more fully described hereinbelow wherein a more detailed description of the association of non-return-to-zero bit drive pulses with the variety of different word drive pulses is set forth.

It is therefore one object of the instant invention to provide a new and improved bit drive method for magnetic memories and the like which appreciably suppresses the occurrence of noise in the memory device through the employment of a novel bit drive pulse so as to appreciably reduce the cycle time for such memories.

Another object of the instant invention is to provide a novel bit drive method for use in magnetic memories and the like which substantially reduces the duration of noise voltages to at least one-half of that encountered in memory systems employing conventional bit drive methods so as to markedly contract the cycle time of such memory devices.

Another object of the instant invention is to provide a novel bit drive method for use in magnetic memories and the like wherein the outstanding feature of the bit drive method resides in the fact that the bit drive currents are applied to memory planes in a "non-return-to-zero" manner (non-return-to-zero or NRZ being the term commonly used in the digital information recording field) instead of applying the conventional "return-to-zero" technique employed in conventional memory drive systems.

These and other objects of the instant invention will become more apparent from a consideration from the following description and drawings in which:

FIGURE 1 is a schematic diagram showing one conventional core memory plane.

FIGURES 2 and 3 each show a plurality of waveforms useful in describing conventional memory driving techniques.

Figure 2:
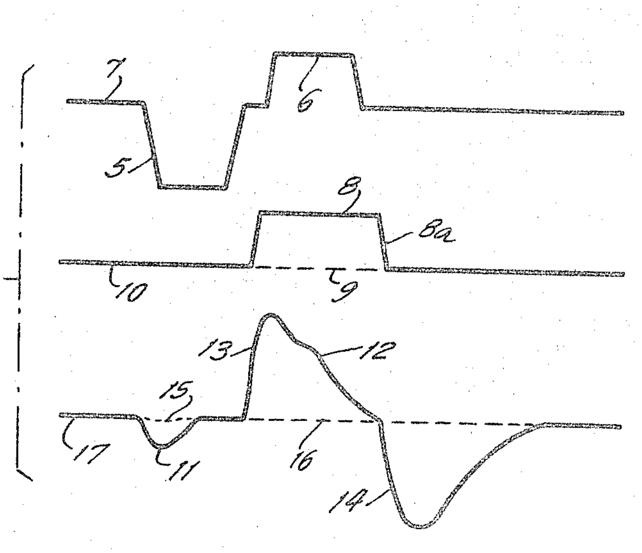
Figure 3:
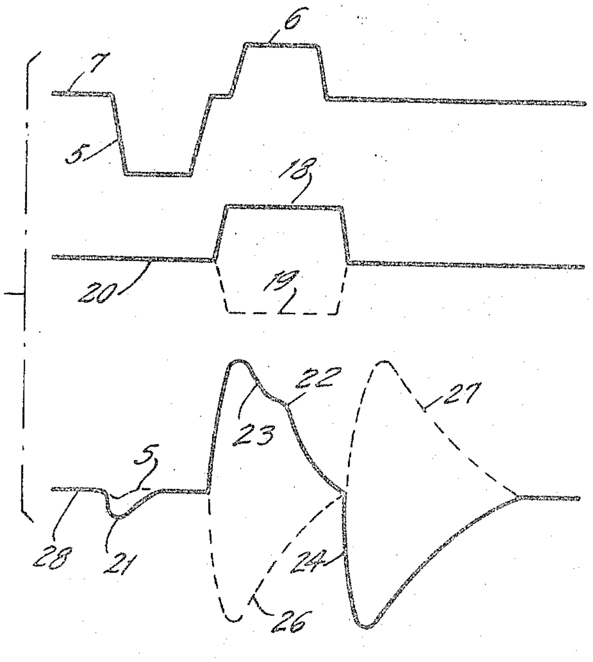
Figure 4:
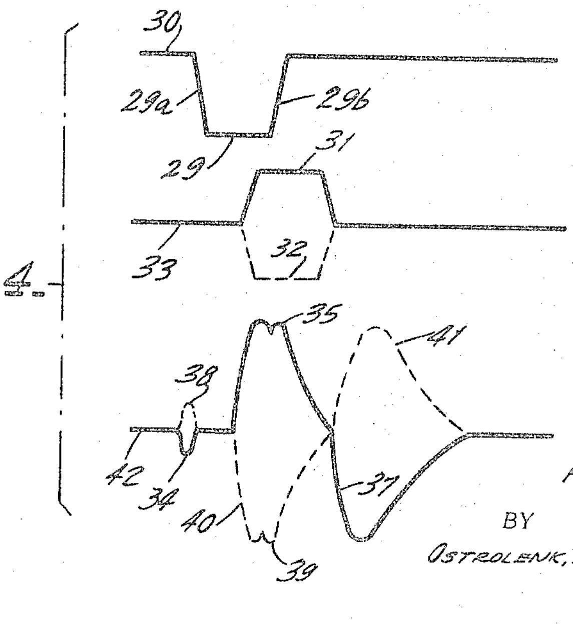
FIGURE 4 illustrates a plurality of pulse waveforms useful in describing the conventional memory driving techniques for operating a magnetic film memory of either the plated wire or planar type.
Figure 6:
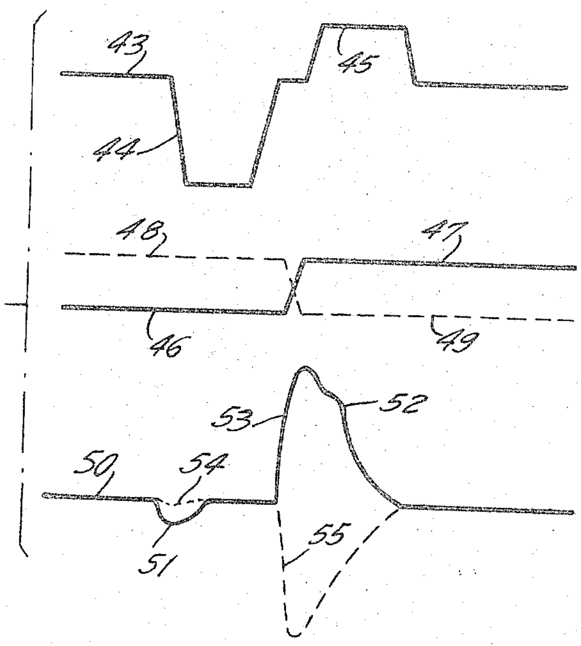
Figure 7:
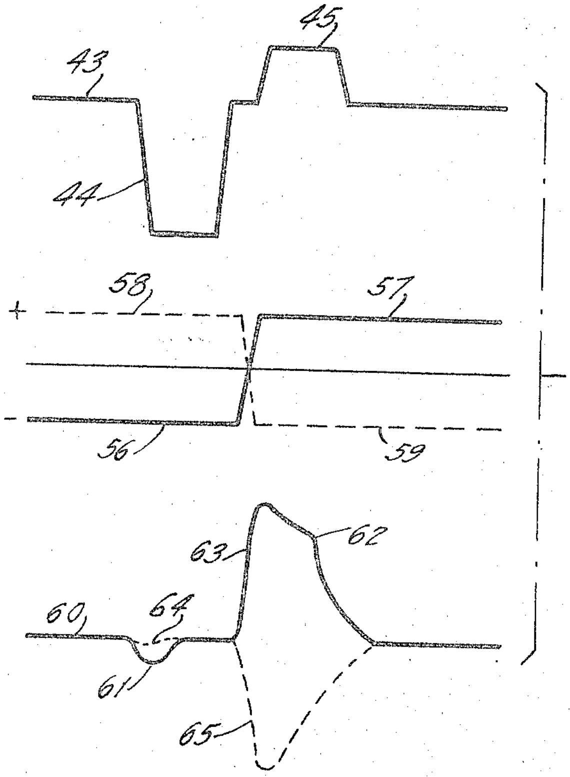
Figure 8:
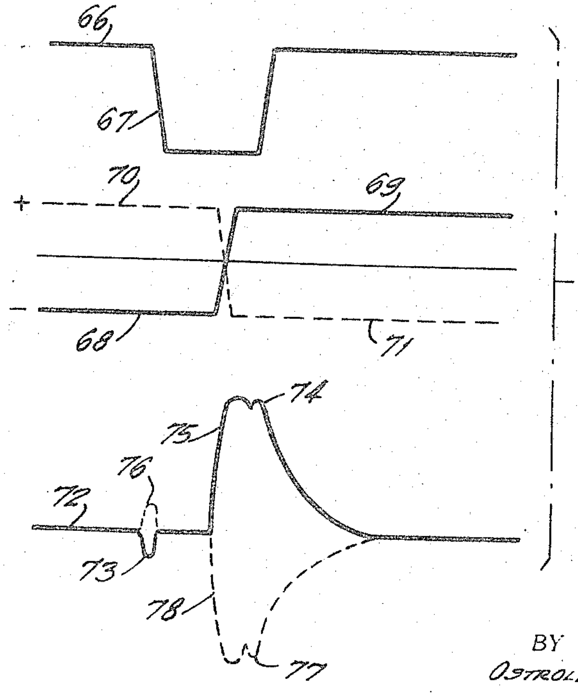

FIGURES 6, 7 and 8 each illustrate a plurality of waveforms useful in describing three bit drive techniques of the instant invention, which techniques correspond to those employed in the waveforms of FIGURES 2–4, respectively.

Figure 1:
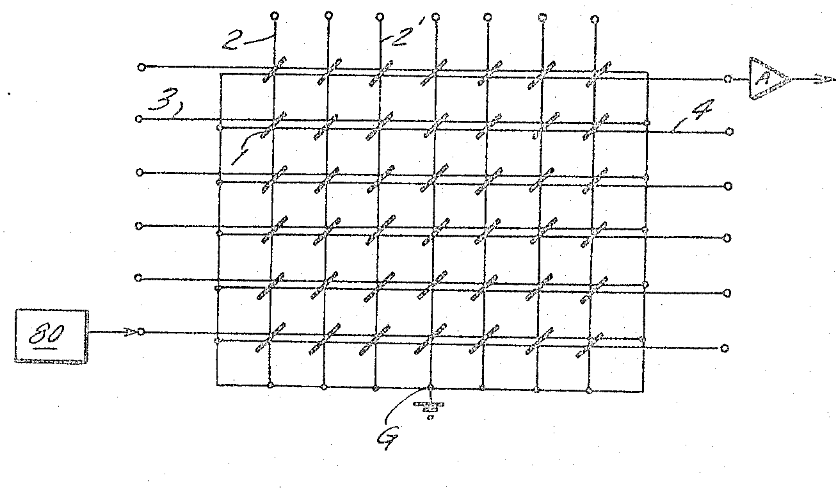

Referring to the drawings, FIGURE 1 shows a core memory of an arrangement commonly referred to as the word arranged type and which is comprised of an ordered set of ferrite cores 1 employed as the memory elements in the matrix. Such ferrite core memory elements are typically toroidal shaped members capable of being driven into and remaining in either one of two saturable states which are commonly referred to as binary ZERO and binary ONE states, respectively. Whereas the instant invention is described as being advantageous for use with such memory planes, it should be understood that any other memory planes such as planar magnetic members and magnetic film memories of either the plated wire or planar types may be employed with equal success in conjunction with the method of the instant invention.

The memory elements 1 are threaded with a plurality of word drive windings 2 arranged in columnar fashion, each winding being capable of driving all of the memory elements in the associated column by means of the word drive pulse. A plurality of bit drive windings arranged in row fashion thread the memory elements 1 of the associated rows and are adapted to receive bit drive pulses (to be more fully described) capable of driving the memory elements in each of the rows.

A plurality of sense (or readout) windings 4 are also arranged in row fashion and thread the memory elements 1 of the associated rows for the purpose of applying voltage signals induced as a result of switching operations of the memory elements 1 to suitable output amplifiers such as, for example, the amplifier A. The opposite ends of the word drive, bit drive and sense windings 2, 3 and 4, respectively, are all returned to ground potential G.

FIGURES 2 and 3 show waveforms useful in explaining the conventional methods employed for writing or reading binary ONES or ZEROS into or from the memory elements.

The pulse train 7, shown in FIGURES 2 and 3, is generally referred to as the "word drive pulses" which are selectively applied to the word drive lines such as for example, the word drive line 2′ of FIGURE 1, during a write-in or a readout operation.

The negative going and positive going pulses 5 and 6 which make up pulse train 7 are normally referred to as the read and write pulses, respectively. A bit drive waveform 10 as shown in FIGURE 2 or 20 shown in FIGURE 3 is applied simultaneously to all of the bit drive lines 3 with a first polarity of the particular pulse applied to selected ones of said lines and the opposite polarities (or no pulse) being applied to the remaining lines being the determining factor in controlling the write-in of either a binary ONE or binary ZERO state, respectively.

Referring specifically to FIGURE 2, bit drive pulse 8 is applied to selected ones of the bit drive windings for the write-in of a binary ONE state. Bit drive pulse 9 (i.e., the absence of bit drive pulse 8) which is shown in dotted fashion is that condition which is applied to selected ones of the bit drive windings 3 for the write-in or readout of a binary ZERO. As can be seen from a timing consideration of waveforms 7 and 10, the positive 8 or the negative 9 bit pulse is applied substantially concurrently with the occurrence of the write pulse 6.

In the bit drive method depicted by the waveforms of FIGURE 3 the application of the positive bit pulse 18 is employed for write-in or readout of a binary ONE state whereas the application of the negative bit pulse 19 is employed for the write-in or readout of a binary ZERO state.

Waveforms 17 and 28 of FIGURES 2 and 3, respectively, depict the signal voltages developed in the sense windings 4 of the memory matrix shown in FIGURE 1 as a result of application of the word drive and bit drive pulse trains. Considering FIGURE 2, a pulse 11 is developed in those sense windings when a binary ONE state is present while a pulse 15, shown in dotted fashion (and which is effectively almost no pulse at all) is developed in the sense winding when a binary ZERO state is present in the memory bit being sensed. The signal voltages 11 or 15 are induced in the sense winding as a result of application of the read pulse 5 to the selected word drive winding 2′, for example.

Considering FIGURE 3, the application of read pulse 5 to the selected word drive winding causes a pulse 21 to develop in the sense winding when its associated memory element stores a binary ONE. In the case where an associated memory element stores a binary ZERO state, the pulse 25 shown in dotted fashion (which is effectively no pulse at all when compared with the magnitude of pulse 21) is developed in the sense winding.

Again, considering FIGURE 2, the application of the write pulse 6 to the selected word drive winding concurrently with the application of the bit drive pulse 8 applied to each of the windings 3 causes a noise voltage signal comprised of the pulses 13, 12 and 14, to be developed in each sense winding 4, whose bit drive winding 3 receives a pulse 8. In the case where selected ones of the bit drive windings receive the waveform condition 9 shown in dotted fashion, the resultant signal developed in the sense winding whose associated bit drive winding receives the pulse condition 9 yields an output signal represented by the dotted line 16. It should be understood that the bit drive windings may all receive either the pulse 8 or the waveform condition 9 or any combination thereof so as to generate an output word which may vary from 000000 to 111111. Since six memory elements are shown in FIGURE 1 as being contained in each column as many as 32 different combinations may be formed as is well known from binary coding theory.

Considering the application of the driving method depicted by the waveforms of FIGURE 3, when write pulse 6 and bit drive pulse 18 are applied in the manner shown, a noise voltage signal comprised of pulses 23, 22 and 24 is developed in each sense winding associated with the bit drive windings receiving the pulse 18. In the case where a write pulse 6 and a bit drive pulse 19 is applied, a noise voltage comprised of pulses 26 and 27 is induced in each sense winding associated with those bit drive windings receiving a bit drive pulse 19.

The projection or hump 12 occurring in noise voltage pulse 13 of FIGURE 2 and the hump 22 occurring in noise voltage pulse 23 of FIGURE 3 is a noise voltage condition induced, respectively, by the effect of the super-position of magnetic fields upon the memory element due to the write pulse 6 and the bit drive pulse 8 of FIGURE 2 or 18 of FIGURE 3 when a binary ONE state is written in to an associated memory element. The height of the hump is of the same order as the amplitude of the signal voltage 11 or 21, respectively, which represents the information bits stored.

The noise voltage pulse 13 and 14 of FIGURE 2 or 23 and 24 of FIGURE 3 or further 26 and 27 of FIGURE 3 (when a negative bit drive pulse 19 is applied) are caused by the application of the bit drive pulses 8, 18 or 19, respectively. With the memory plane as shown in FIGURE 1, it can be seen that the bit drive lines 3 and the associated sense lines 4 are arranged in parallel fashion relative to one another and are positioned extremely close to one another, which results in the bit and sense windings being electrostatically and electromagnetically coupled. The result of this coupling is a development of extremely large noise voltages which are induced in the sense lines 4 at the leading and trailing edges of the bit drive pulses 8, 18 or 19. The magnitudes of these noise voltages reach normally as high as from several tens to several hundred times the signal voltage 11 or 21.

The waveforms employed for driving a magnetic film memory of either the plated wire or planar type in the conventional manner are illustrated in FIGURE 4. The word drive pulse 30 for this type of memory is comprised of a single negative going pulse 29, for example, wherein the leading **29*a* and trailing 29*b* edges of the pulse are respectively employed for reading and writing operations. The bit drive waveform 33 is comprised of a positive going pulse 31 for writing a binary ONE or a negative going pulse 32 shown in dotted fashion for writing a binary ZERO. Either of the pulses which may be employed is applied concurrently with the latter half of the word drive pulse 29** as illustrated.

The voltages induced in the sense lines 4, as a result of application of word drive pulse 30 and bit drive pulse 31, is comprised of an information signal voltage pulse 34 and noise voltage pulses 36, 35 and 37. In the case where negative going bit drive pulse 32 is applied in conjunction with pulse 29 an information signal voltage 38 and noise signal voltages 40, 39 and 41 are developed in the associated sense winding, which pulses are shown in dotted fashion. As was previously the case, pulses 36 and 37 (or 40 and 41) are due to the electrostatic and electromagnetic coupling between the bit drive lines 3 and the sense lines 4. The amplitudes of the noise voltages can be seen to be extremely large and, in any case, much greater than the amplitude of the information signal voltages 34, 38. The relationship between information signals and noise signals for magnetic film memories can, therefore, be seen to be much the same as those which exist for ferrite core memories, as shown by the information and noise signal waveforms of FIGURES 2 and 3.

Whereas no thin film memories have been illustrated herein, it should be understood that the conventional driving methods described herein, as well as the novel driving method yet to be described, may be used with any of the presently known types of memories. Typical thin film memories of the wire type which may be employed with all of the driving methods described herein are set forth in copending U.S. applications Ser. No. 413,276, filed Nov. 23, 1964 now Patent No. 3,411,892; Ser. No. 431,318, filed Feb. 9, 1965; Ser. No. 572,722, filed Aug. 16, 1966 and Ser. No. 565,438, filed July 15, 1966 now abandoned. Typical thin film memories of the planar type which may be employed with all of the driving methods described herein are set forth in copending U.S. application Ser. No. 413,276, filed Nov. 23, 1964 now Patent No. 3,411,892. Since the actual configuration of the memories employed lend no novelty to the method of the instant invention, detailed descriptions of such thin film memories have been omitted herein for purposes of simplicity.

Re-examination of the noise signals developed in sense windings as a result of the application of bit and word drive pulses clearly show that the readout operation for the next readout cycle must be delayed until the noise voltages 14 of FIGURE 2, 24 or 27 of FIGURE 3 or 37 or 41 of FIGURE 4, which occur subsequent to the trailing edge of bit drive pulses 8, 18, 19, 31 or 32, respectively, have subsided or have otherwise been sufficiently attenuated as compared with the information signal voltage levels.

In addition thereto, the signal voltages 11, 21, 32 and 38 must be amplified by an amplifier means such as, for example, amplifier A of FIGURE 2 so as to be useful for subsequent operations within a computer data processer or other similar device. However, such amplifiers have invariably been found to become completely saturated by the large noise voltages causing a very harmful effect in their operation. As a result, a considerable time interval must elapse before the saturated state of the amplifier is sufficiently cleared to enable the initiation of the next reading cycle.

The deleterious effects of the noise voltage signals requires that the cycle times of conventional magnetic memories be made very much longer than the inherent pulse durations necessary for switching magnetic memory elements; thus effectively destroying the value of employing memory elements or thin film memories having very high switching speeds.

Figure 5:
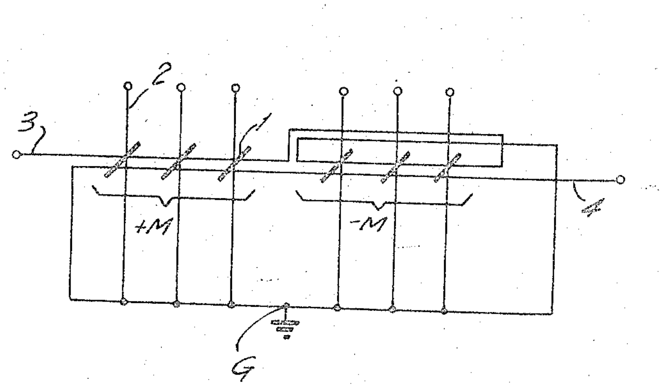
FIGURE 5 is a schematic diagram showing only a portion of a core memory plane and illustrating a conventional wiring method for effecting cancellation of noise which is encountered in the employment of conventional memory plane driving techniques.

However, several structural improvements for memory planes have been developed in an effort to reduce noise voltage amplitudes. FIGURE 5 illustrates one typical structural improvement which is employed for reducing electrostatic and electromagnetic coupling between sense and drive lines. It should be noted that only one row of a matrix plane has been illustrated in schematic form in FIGURE 5 for purposes of simplicity, it being understood that a plurality of rows would normally be employed in such matrix planes in the manner shown in FIGURE 1.

As illustrated, the bit drive line 3 of FIGURE 5 is equally divided into two parts in such a manner that the coupling coefficient between the left half of bit line 3 and the sense line 4 is positive (+M), for example, while the coupling between the right half of bit line 3 and sense line 4 is negative (−M) so that the overall inductive coupling coefficient may be nullified. This effect is brought about by forming the right-hand half of bit drive winding 3 in the configuration of a rectangular loop with the lowermost horizontal portion of the loop lying in close proximity to sense winding 4 to effect the negative coupling. The two upper portions of the loop theoretically are removed by a sufficient distance so as to be decoupled from sense winding 4. Although the arrangement of FIGURE 5 is theoretically effective, experimentation has clearly shown that this method does not completely eliminate noise voltages as a practical matter since the coupling coefficients +M and −M do not exactly cancel one another as a result of the dimensional tolerances of the memory plane design and as a result of the unbalanced information pattern to be stored.

From a consideration of the conventional bit drive methods discussed above it can be seen that the bit drive current is generated on a "return-to-zero" basis. In other words, the required level of the bit drive current is maintained for a requisite time interval within each memory timing cycle and is reduced to the zero current level at all other times. Thus, the level of the bit drive current is caused to vary twice in each cycle time, once at the leading edge and once at the trailing edge of the bit drive current pulse. The most significant effect upon the noise voltage is induced by the trailing edge of the bit drive pulse which thus becomes the major obstacle impeding efforts to substantially contract cycle time of the memory.

The instant invention provides a new bit drive method which completely eliminates the noise voltage induced as a result of the presence of the trailing edge of the bit drive pulse. A detailed description of the method will now be set forth in connection with the memory arrangement of FIGURE 1 and the waveform illustrations of FIGURES 6 through 8.

FIGURE 6 illustrates the pulse waveforms employed in the novel bit drive method for core memory planes of the type shown in FIGURE 1. The word drive pulse train 43 is comprised of a read pulse 44 followed by a write pulse 45, which pulses are substantially the same in both amplitude and time duration as the read and write pulses of the word drive pulse train 7 illustrated in FIGURE 2 or 3. However, the bit drive current employed herein has a "non-return-to-zero" waveform which varies from a zero current level 46 to a predetermined positive level 47, as shown by the solid line or alternatively from a positive level 48 to a zero level 49 as shown by the dotted lines or alternatively may be a constant positive or negative level. The bit drive current rises (or lowers) to the necessary value (or is maintained at one constant level) depending upon the binary state desired to be written in or read out, just prior to the time that the write pulse 45 achieves its maximum level. The bit drive current is sustained at this level until a time just prior to the instant at which the write pulse 45 in the next cycle time occurs. For example, changes in the bit drive current indicated as 46→47 (as shown in solid line fashion) or 48→49 (as shown in dotted line fashion) illustrate examples wherein a binary ZERO (or ONE) was first written in and a binary ONE (or ZERO) is written in, in the present cycle. It should be noted that when a succession of binary ZEROS or binary ONES are written in, the bit current level remains unchanged. For example, if a succession of binary ONES are written in, the bit current level remains at the level designated by numeral 47 and is sustained until it is required that a binary ZERO level be written in. The operation is similar for write-in of a succession of binary ZERO bits with the current remaining at the zero level as shown by numeral 46 (or 49) until a binary ONE level is required to be written in.

As a result of application of the waveform 43 to the word drive lines and the waveform 46→47 to selected bit drive lines, the voltages induced in the sense line 4 are illustrated by waveform 50 which generates an information readout voltage pulse 51 which is substantially similar to the binary ONE information signal voltages developed through the use of conventional driving methods. In the case where a bit drive waveform 48→49 is applied to selected bit drive windings, information signal pulse 54 is generated in the sense winding which likewise is similar to the binary ZERO information pulse developed through the use of the conventional methods described above.

The hump 52 occurring in waveform 50 which is induced by the write pulse 45 and the bit drive current 47 is also substantially similar to the humps 12 and 22 shown in FIGURES 2 and 3.

The induced noise signal 53 (or 55 shown in dotted fashion) caused by changes in the level of the bit drive current has a leading edge which is substantially similar to the leading edge of pulse 13 shown in FIGURE 2 caused as a result of the bit current pulse 8 of that figure. With the exception of the fact that the polarity of the noise voltage is positive, as shown by waveform 53, or negative, as shown by dotted line waveform 55, as the bit drive current is caused to vary in the positive or negative direction, respectively.

The outstanding feature of the bit drive method in accordance with the instant invention is the elimination of the trailing edge 8*a* of bit drive pulse 8 (see FIG. 2) which, in turn, completely eliminates the possibility of occurrence of the negative going noise voltage signal 14 shown in FIGURE 2. This novel method reduces by at least one-half the time period of the noise voltage signal developed so as to enable an accompanying significant decrease in memory cycle time.

FIGURE 6 shows waveforms describing the novel bit drive method applicable for use with the memory plane of FIGURE 1.

FIGURES 7 and 8 illustrate waveforms describing novel bit drive methods which correspond, respectively, to the conventional bit drive methods illustrated in FIGURES 3 and 4 and hence which may be used in thin film memory systems of the wire or planar type. The read and write pulses 44 and 45 of waveform 43 shown in FIGURE 7, and which constitute the word drive pulses, can be seen to be substantially similar to the read and write pulses 5 and 6 of the word drive waveform 7 shown in FIGURE 3. The bit drive waveforms of FIGURES 3 and 7, however, can be seen to be quite different for the reason that the bit drive waveform of FIGURE 3 is applied on a "return-to-zero" basis whereas the bit drive waveform 56→57 or 58→59 shown in dotted fashion, is applied on a "non-return-to-zero" basis. Likewise, comparing the waveforms of FIGURES 4 and 8, the word drive waveforms 30 and 66, respectively, can be seen to be quite similar, whereas, the bit drive waveforms 33 and 68→69 or 70→71, shown in dotted fashion are, respectively, applied on a "return-to-zero" and a "non-return-to-zero" basis. In other words, in lieu of either positive pulse 18 or negative pulse 19 of FIGURE 3, the bit drive current pulse of FIGURE 7 varies from negative level 56 to positive level 57 or from positive level 58 to negative level 59 to effect the improved method. As a result of concurrent application of bit and word drive waveforms shown in FIGURE 7, waveform 60 is induced in the sense winding of the memory plane. Waveform 61 represents a binary ONE output indication where as waveform 64, shown in dotted fashion, indicates a binary ZERO output. The hump noise voltage output 62 is induced in the sense winding as a result of application of write pulse 45 and is substantially similar to the humps 12 and 22 occurring in the sense winding as shown in FIGURES 2 and 3. The noise voltage pulse which occurs as a result of application of the bit drive waveform 56→57 is indicated at 63, whereas, the noise voltage induced by bit drive current 58→59 (shown in dotted fashion) is indicated at 65. As a result of the "non-return-to-zero" bit drive waveform it can clearly be seen that the negative going pulse 24 or positive going pulse 27 (shown in dotted fashion) occurring through the use of conventional bit drive methods as shown in FIGURE 3, is completely eliminated in waveform 60 of FIGURE 7.

FIGURE 8 illustrates the word and bit drive waveforms and induced voltages appearing in the word bit and sense lines of a magnetic film memory of either plated wire or planar type.

In this particular application, the word drive pulse train 66 is comprised of a single negative going pulse 67 which is quite similar to the negative going pulse 29 of FIGURE 4. Concurrent application of the word drive waveform 66 and the bit drive waveform 68→69 causes an induced signal voltage to apear in the sense winding represented by waveform 72. The information signal voltage developed is the negative going pulse 73, whereas the noise signal voltage developed is the waveform 75 having a hump 74.

When the bit drive waveform 70→71 is applied concurrently with the word drive waveform 66, the output occurring in the sense winding is shown by waveform 72 and is comprised of a positive going information voltage signal 76 and a negative going noise voltage signal 78 having a hump 77, with the pulses 76 and 78 being shown in dotted fashion. The information and noise signals 73 and 75 are substantially similar to pulses 34 and 36, respectively, shown in FIGURE 4. However, it should be noted that the negative going noise voltage signal 37 of FIGURE 4 is completely eliminated through the use of the bit drive method of FIGURE 8. The pulses 76 and 78 shown in dotted fashion in FIGURE 8 are quite similar to the pulses 38 and 40, respectively, shown in FIGURE 4; but, again it should be noted that the positive going noise signal pulse 41 of FIGURE 4 is completely eliminated through use of the bit drive method of FIGURE 8. Thus, regardless of which "non-return-to-zero" bit drive waveform is employed, as shown in FIGURE 8, the second noise signal pulse is completely eliminated.

It can, therefore, be seen that the novel bit drive method employed herein completely elimiantes the trailing edge of the bit drive pulse which significantly contributes to the reduction of the time interval required for initiation of the next memory cycle and, at the same time, contract the cycle time per se.

In application of the novel drive method to core memories some care must be exercised in selecting the amplitude of the word drive waveform. For example, the read pulses 44, included in the word drive waveform 43 of FIGURES 6 and 7, have a maximum amplitude which is slightly larger than the maximum amplitude of the read pulse 5, shown in FIGURE 2 for the following reasons:

The bit drive current is applied on a "non-return-to-zero" basis. Thus, whenever there is conduction of read pulse 44 (see FIGS. 6 and 7) this pulse is always applied concurrently with either a negative or positive current level 56 or 58, respectively. There is thus a necessity for overcoming the cancellation effect that the bit drive pulse possesses with respect to the read pulse.

The increment of read pulse amplitude which is required is governed by the characteristics of the memory element, it being generally sufficient to increase the amplitude of the read pulse by an amount equal to the amplitude of the bit drive current, i.e., the amplitude between the zero current level and the positive current level or between the zero current level and the negative current level (which are preferably equal).

The bit drive method of the instant invention can be seen to have a great deal of practical utility due to the fact that the bit drive current is furnished on a "non-return-to-zero" basis resulting in considerable reduction in inductive noise within the memory plane sense winding which further results in a substantatial reduction in cycle time of the memory device.

As a further application of the instant invention, it should be understood that the means such as, for example, the means 80 for use in driving the bit drive lines 3 of FIGURE 1, may assume a variety of forms so long as the output of the drive means 80 is capable of assuming either one of two different output states. For example, means 80 may be a bistable flip-flop circuit, a Schmitt trigger circuit controlled by any suitable form of a bistable circuit or an amplifier circuit capable of generating an output waveform of the "non-return-to-zero" basis, as depicted by the bit drive waveforms of FIGURES 6 through 8.

As will be obvious to those skilled in the art from the foregoing description of the bit drive method in connection with three typical embodiments, the principles of the instant invention can find application on any one of the core plated wire or planar magnetic film memories. It should, therefore, be understood that the details of the particular applications of the bit drive method described herein are not intended to limit the invention and various modifications will be obvious to those with ordinary skill in the art and applicant intends to be limited to an invention of a scope as defined by the following claims.

The embodiments if the invention in which an exclusive privilege or property is claimed are defined as follows:

1. A method for operating magnetic memories typically comprised of an ordered arrangement of bistable memory elements, and bit drive, word drive and sense lines inductively coupled to said memory elements, said method comprising the steps of sequentially applying a read signal followed by a write signal to a selected one of said word drive windings, whereby each read signal followed by a write signal constitutes a memory operating cycle; applying bit drive currents to selected ones of said bit drive windings on a "not-return-to-zero" basis wherein a change in the current magnitudes is generated only once during any given cycle and further occurs only after the read signal has terminated;

sensing the signal and noise voltage signals induced in selected ones of said lines.

2. The method of claim 1 wherein the step of applying a word driver current is further comprised of applying a negative going current pulse followed by a positive going current pulse, said pulses occurring within one memory operating cycle and respectively consistuting the read and write phases of a memory operating cycle.

3. The method of claim 1 wherein the step of applying a bit current pulse further includes applying a bit current pulse of a constant negative level when writing in or reading out a binary ZERO in the associated memory element in the previous memory timing cycle, and changing the current to a constant positive current level substantially concurrently with the leading edge of the positive going word drive current pulse for writing in or reading out a binary ONE during the present memory timing cycle.

4. The method of claim 1 wherein the step of applying a bit current pulse further includes applying a bit current pulse of a constant positive level when writing in or reading out a binary ONE in the associated memory element in the previous memory timing cycle, and changing the current to a constant negative current level substantially concurrently with the leading edge of the positive going word drive current pulse for writing in or reading out a binary ZERO during the present memory timing cycle.

5. The method of claim 1 wherein the step of applying a bit current pulse further includes applying a bit current pulse of a constant negative level when writing in or reading out a binary ZERO in the associated memory element in the previous memory timing cycle, and maintaining the current at said constant negative current level for reading out a binary ZERO during the present memory timing cycle.

6. The method of claim 1 wherein the step of applying a bit current pulse further includes applying a bit current pulse of a constant positive level when writing in or reading out a binary ONE in the associated memory element in the previous memory timing cycle, and maintaining the current at said constant positive current level for reading out a binary ONE during the present memory timing cycle.

7. The method of claim 1 wherein the step of applying a bit current pulse further includes applying a bit current pulse of a constant negative level when writing in or reading out a binary ZERO in the associated memory element in the previous memory timing cycle, and changing the current to a constant positive current level at an instant of time substantially intermediate the leading and trailing edges of said word drive current pulse for writing in or for reading out a binary ONE during the present memory timing cycle.

8. The method of claim 1 wherein the step of applying a bit current pulse further includes applying a bit current pulse of a constant positive level when writing in or reading out a binary ONE in the associated memory element in the previous memory timing cycle, and changing the current to a constant negative current level at an instant of time substantially intermediate the leading and trailing edges of said word drive current pulse for writing in or for reading out a binary ZERO during the present memory timing cycle.

9. The method of claim 1 wherein the step of applying a bit current pulse further includes applying a bit current pulse of a constant negative level when writing in or reading out a binary ZERO in the associated memory element in the previous memory timing cycle, and maintaining the current at said constant negative current level for reading out a binary ZERO during the present memory timing cycle.

10. The method of claim 1 wherein the step of applying a bit current pulse further includes applying a bit current pulse of a constant positive level when writing in or reading out a binary ONE in the associated memory element in the previous memory timing cycle, maintaining the current at said constant positive current level for reading out a binary ONE during the present memory timing cycle.

11. A method for performing repetitive write and read operations in magnetic memories having a matrix of magnetic memory elements each inductively coupled to associated word, digit and sense windings comprising the steps of:

(a) selectively applying a word signal to a selected word winding during each memory operating cycle;

(b) providing at least first and second transitions in each of said word signals representing initiation of the read and write phases of the memory operating cycle;

(c) selectively applying either one of two constant signal levels to each digit winding to cooperate with a second transition of its associated word signal for writing a binary state into the desired memory element;

(d) maintaining this signal level during each successive memory operating cycle in which the binary state of the desired memory element remains the same as the previous cycle;

(e) applying the opposite signal level to each digit winding during each cycle in which the memory state of the associated element is different from the preceding cycle;

(f) performing the transition between said first and second constant levels, when required, only once during any cycle wherein the transition occurs a predetermined time after the termination of the first transition in the associated word signal and not later than the termination of said second transition, thereby significantly reducing the minimum time delay between the termination of each cycle and initiation of the next occurring cycle.

12. A method for performing repetitive write and read operations in magnetic memories having a matrix of magnetic memory elements each inductively coupled to associated word, digit and sense windings comprising the steps of:

(a) selectively applying a word signal to a selected word winding during each memory operating cycle;

(b) providing at least first and second transitions in each of said word signals representing initiation of the read and write phases of the memory operating cycle;

(c) selectively applying either one of two constant signal levels to each digit winding to cooperate with a second transition of its associated word signal for writing a binary state into the desired memory element;

(d) maintaining the selected constant signal level on the digit lines at least throughout the write phase of the cycle of its selection and the read phase of the next occurring cycle;

(e) maintaining this signal level during each successive memory operating cycle in which the binary state of the desired memory element remains the same as the previous cycle;

(f) applying the opposite signal level to each digit winding during each cycle in which the memory state of the associated element is different from the preceding cycle wherein said opposite signal level is applied only after termination of the read phase of its cycle of selection;

(g) performing the transition between said first and second constant levels, when required, only once during any cycle wherein the transition occurs a predetermined time after the termination of the first transition in the associated word signal and not later than the termination of said second transition, thereby significantly reducing the minimum time delay between the termination of each cycle and initiation of the next occurring cycle.

13. The method of claim 12 wherein the step (a) includes the step of generating a single pulse whose leading and trailing edges constitute said first and second transitions, respectively.

14. The method of claim 12 wherein the step (a) includes the step of sequentially generating a pair of pulses of opposite polarity during each cycle, each pulse having a leading and trailing edge wherein the leading edges of said pulses constitute the initiation of said write and read phases, respectively.

References Cited

UNITED STATES PATENTS

| | | | |
|---|---|---|---|
| 3,274,611 | 9/1966 | Brown et al. | 346—14 |
| 3,383,665 | 5/1968 | Kashiwagi | 340—174 |

BERNARD KONICK, Primary Examiner

GARY M. HOFFMAN, Assistant Examiner